United States Patent [19]

Tokawa et al.

[11] 4,124,477
[45] Nov. 7, 1978

[54] ELECTROLYTIC CELL UTILIZING PRETREATED SEMI-PERMEABLE MEMBRANES

[75] Inventors: Daniel T. Tokawa, Vancouver; Bernardus J. Mentz; Jeffrey D. Eng, both of North Vancouver, all of Canada; Edward H. Cook, Jr., Lewiston; Gerald R. Marks, Youngstown, both of N.Y.

[73] Assignee: Hooker Chemicals & Plastics Corp., Niagara Falls, N.Y.

[21] Appl. No.: 729,639

[22] Filed: Oct. 5, 1976

Related U.S. Application Data

[63] Continuation of Ser. No. 574,844, May 5, 1975, abandoned, which is a continuation-in-part of Ser. No. 416,916, Nov. 19, 1973, abandoned.

[51] Int. Cl.² .................. C25B 13/02; C25B 13/08; C25B 9/00; C25B 1/34
[52] U.S. Cl. ................................. 204/252; 204/283; 204/296
[58] Field of Search .............. 204/98, 252, 295, 296, 204/282, 283

[56] References Cited

U.S. PATENT DOCUMENTS

| | | | |
|---|---|---|---|
| 3,116,355 | 12/1963 | Oswin | 264/317 |
| 3,657,104 | 4/1972 | Hodgin | 204/301 |
| 3,773,634 | 11/1973 | Stacey et al. | 204/98 |
| 3,852,135 | 12/1974 | Cook et al. | 156/94 |
| 3,905,879 | 9/1975 | Eng et al. | 204/92 |

OTHER PUBLICATIONS

Prefluorinated Ion Exchange Membranes by Grot et al., 6 pp., Delivered Electrochem. Soc. Meeting, Houston 5/72.

Primary Examiner—F.C. Edmundson
Attorney, Agent, or Firm—Peter F. Casella; Herbert W. Mylius

[57] ABSTRACT

An electrolytic cell suitable for use in electrolyzing ionizable chemical compounds, particularly alkali metal halide brines and hydrohalic acids, which comprises a cell body having an anode compartment containing a porous anode and a cathode compartment containing a cathode said compartments being separated from each other by a prestretched, taut membrane barrier which is substantially impervious to gases and liquids and which is selected from a hydrolyzed copolymer of a perfluorinated hydrocarbon and a sulfonated perfluorinated hydrocarbon and a sulfonated perfluorovinyl ether, and a sulfostyrenated perfluorinated ethylene propylene polymer, said barrier being pretreated by hydrolyzing and stretching prior to insertion in the cell.

Such cells can be operated at constant low voltage, and are not subject to erratic operating voltages which are due, in part at least, to the accumulation of gases between the anode and diaphragm.

19 Claims, 1 Drawing Figure

ELECTROLYTIC CELL UTILIZING PRETREATED SEMI-PERMEABLE MEMBRANES

This application is a continuation of application Ser. No. 574,844, filed May 5, 1975, and now abandoned, which is in turn a continuation-in-part of Ser. No. 416,916, filed Nov. 19, 1973, abandoned.

FIELD OF INVENTION

This invention relates to improvements in electrolytic cells wherein the anode and cathode are separated by a prestretched, taut cation-active permselective membrane. More particularly it relates to a method of pretreating the membrane and to cells utilizing the pretreated membrane.

BACKGROUND OF THE INVENTION

The electrolysis of aqueous solutions of ionizable chemical compounds, particularly of brine solutions, in a cell equipped with an anode and a cathode separated by a porous diaphragm, barrier, or septum, is well known in the art. In most instances, such cells, be they two compartment or multicompartment cells, are operated under conditions such that ionic and molecular migration through the porous diaphragm occurs to a substantial degree resulting in contamination of the cathode liquor with undecomposed electrolyte and of the anode liquor with reaction products of the cathodic material and the anodic materials.

It has been proposed to replace the porous diaphragm in such cells with a barrier impervious, or substantially so, to both liquids and gases thereby to control both ionic and molecular migration during electrolysis. Many patents, such as U.S. Pat. Nos. 2,967,807, 3,390,055, and French Pat. No. 1,510,265, disclose electrolytic cells incorporating as the barrier, membranes fabricated from synthetic organic ion-exchange resins. However, such resins have not been entirely satisfactory due to their sensitivity to the strong caustic or acidic media with which they were in contact during use, or the voltage drop through the membrane became excessive as the caustic concentration increased, or such resins and/or their fabrication were too costly.

More recently, as disclosed in copending application Ser. No. 212,171 of E. H. Cook Jr. et al., filed Dec. 27, 1971, high purity products in high yield without undue loss of electrical current and loss of product yield due to ionic and/or molecular migration could be obtained when the electrolytic cells comprised a barrier formed from a permselective membrane composed essentially of a hydrolyzed copolymer of tetrafluoroethylene and a sulfonated perfluorovinyl ether. This barrier material was found to possess the desirable attributes of retaining its effectiveness, that is chemical inertness, over extended periods of use in electrolytic cells. However, the barrier material was found to expand during use under the cell operating conditions. This resulted in the development of folds and/or creases on the anode side of the barrier and the entrapment of chlorine gas (when brine was used as the anolyte) in the folds and/or creases. Such entrapment of gaseous products resulted in half cell voltage readings in both anode and cathode compartments which were about 0.4 to 0.6 volts higher than normally expected.

Careful voltage analysis of the operating cells has shown that the erratic voltages were, in part, associated with a gasing problem at the anode. It has been observed that at times gas would accumulate at the upper portion of the anode structure causing an uneven distribution of the electrical current on the anode.

It is postulated that membranes that have been installed without pretreatment become hydrolyzed during operation of an electrolytic cell and upon taking up water they expand. The expansion allows a sagging or blistering effect to take place and the blisters or sags fill up with trapped chlorine gas. The trapped gas causes extra resistance between the anode and the cathode, or buffer compartment and causes the anode half cell potential to increase due to increased current density through the rest of the membrane.

OBJECTS OF THE INVENTION

It is thus a primary object of this invention to provide an effective method for the production of barriers for use in electrolytic cells which do not undergo substantial expansion during operation of the cell.

Another object is to provide improved barriers for use in electrolytic cells which do not cause substantial increases in the half cell voltages of the anode and cathode compartments of the cell during operation thereof.

Still another object is to assemble such a cell containing a cation-active permselective membrane barrier in such a manner as to consistently maintain the lowest possible operating cell voltage.

Other objects and advantages will be apparent to those skilled in this art upon consideration of this specification and appended claims.

SUMMARY OF THE INVENTION

The objects and advantages of this invention are accomplished by providing a electrolysis cell having an anode, a cathode and a barrier member composed essentially of at least one cation-active permselective material which barrier member is pretreated by hydrating and prestretching. The taut membrane is then clamped in place on the electrode. The membrane may be glued in place by means of a suitable adhesive, or the methods further described hereinafter. "Membrane Material" as used in the following description refers to such material consisting essentially of at least one cation-active permselective material selected from the group consisting of a hydrolyzed copolymer of a perfluorinated hydrocarbon and a fluorosulfonated perfluorovinyl ether, and a sulfostyrenated perfluorinated ethylene propylene polymer.

DETAILED DESCRIPTION OF THE INVENTION

Figure 1:
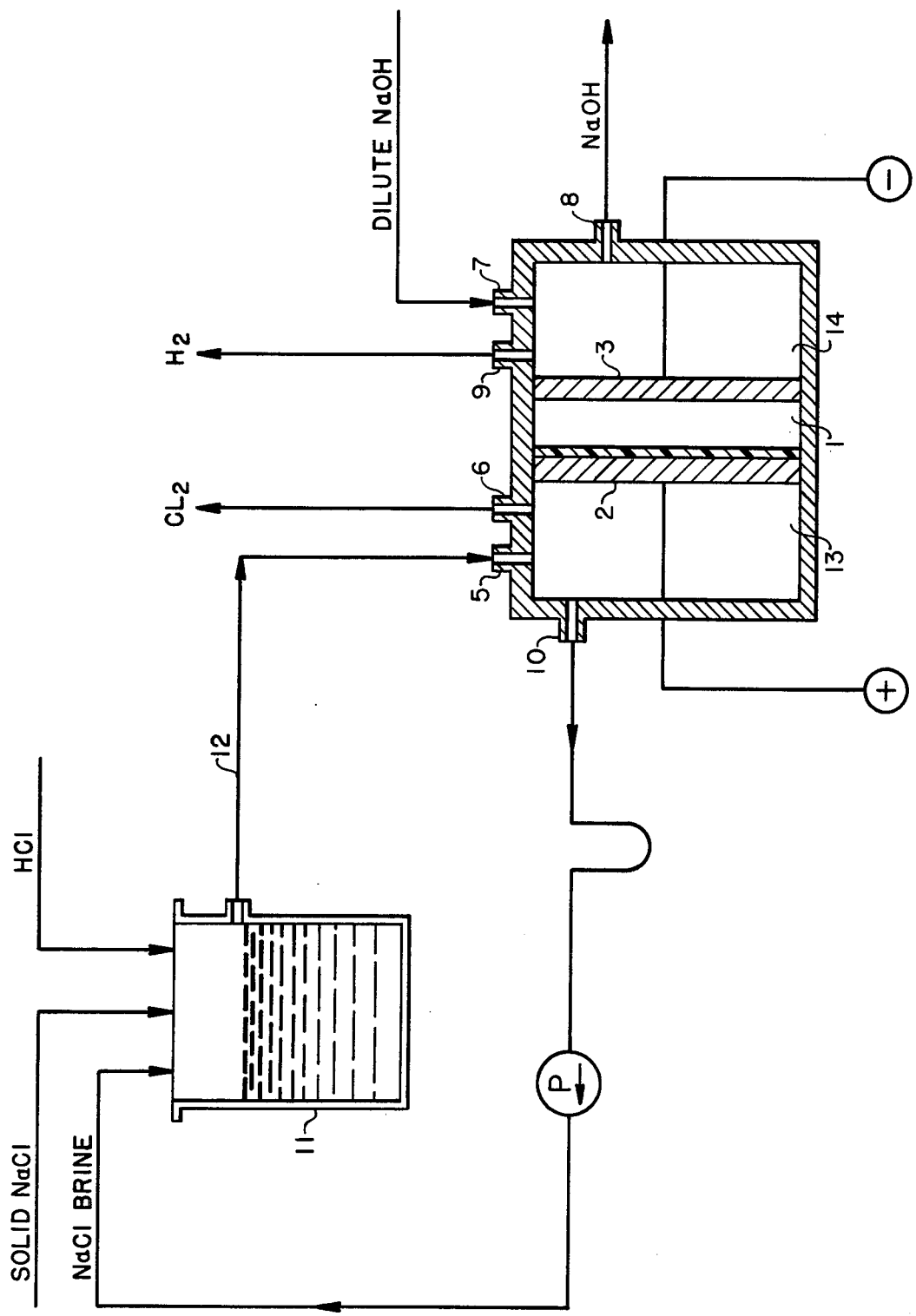

Thus, in accordance with a preferred mode of carrying out this invention, an electrolytic cell for decomposing aqueous sodium chloride solutions is shown in FIG. 1, wherein the electrolytic cell, 1, comprising a porous anode, 2, and a cathode 3, are separated by a pretreated cation-active permselective membrane tautly positioned on one surface of the anode and held in place thereon by suitable adhesive means. There is thus formed an anolyte compartment, 13, and a catholyte compartment, 14. The cell, 1, has an inlet, 5, in the anolyte compartment, for the electrolyte, i.e., the brine solution, an outlet, 10, for the spent electrolyte and an outlet, 6, for the chlorine gas formed on the back face of the porous anode.

In accordance with a preferred mode of carrying out the invention, a membrane material of predetermined dimensions, sufficient to completely cover the anode member to which the membrane is to be placed in barrier relationship, is immersed in boiling water for a period of time, generally about 1 to 4 hours, to hydrolyze and render the membrane soft and pliable. Thereafter the softened membrane is placed on a suitable frame, having the approximate dimensions of the said anode member. The membrane is stretched diagonally and clamped at the corners of the frame. The sides of the membrane are then tautly stretched and clamped to the sides of the frame. The corner clamps are then removed, leaving the side clamps giving a flat, taut, unobstructed surface. The stretched membrane is left to dry at ambient conditions on the frame. In drying the membrane material becomes dry to the touch, but the water taken up in the hydrolysis step largely stays within the membrane material. An adhesive, for example an epoxy cement, is applied to the flange portions of an anode member and the frame is positioned on the anode member, so that the pretreated stretched membrane surface is in contact with the adhesive containing side of the anode member. The frame is pressed against the adhesive and clamped on to the anode member. When the cement has set, about 1 to 3 hours, the clamps are removed and the frame is lifted off the membrane, which is now secured to the flange of the anode member. Preferably, the excess portion of the membrane overhanging the anode member is then trimmed and the excess membrane material remaining at the edges is cemented to flange with a suitable adhesive material.

In order that the invention may be more readily understood, it will be described with specific reference to various apparatus and methods suitable for the electrolysis of an aqueous solution of sodium chloride whereby chlorine, caustic soda, and hydrogen are efficiently and economically produced. It is not, however, to be construed as limited thereto except as defined in the appended claims.

In the following description of the preferred embodiments of the present invention references will be made to the drawings attached hereto of which FIG. 1 is a schematic representation of a conventional two compartment electrolysis embodying the pretreated, taut membrane-anode configuration. There is also provided an inlet, 7, for charging liquids, such as dilute aqueous caustic soda, to the catholyte compartment, 14, an outlet, 8, for discharging NaOH liquor from the catholyte compartment and an outlet, 9, for discharging gas, such as hydrogen gas, formed at the surface of the cathode.

In operation of this electrolytic cell, 1, saturated brine preferably, brine which has been acidified by the addition thereto of an acid, such as hydrochloric acid, to a pH of about 3 to about 5, is continuously circulated in the anolyte compartment, 13, by introducing the brine through inlet, 5, and withdrawing it through outlet for overflow, 10, to the replenishing zone, 11, where the spent brine is resaturated with sodium chloride and acidified with acid, e.g. HCl, of desired. The replenished brine flows, via line 12, to reenter the cell, 1, at inlet 5.

Concurrently, dilute aqueous liquor, such as dilute aqueous caustic soda is charged to the catholyte compartment, 14, through liquid inlet, 7, and discharged from said compartment, 14, through overflow outlet, 8. Thereby the aqueous liquor is concentrated with respect to the product formed at the cathode, e.g., caustic soda, and the discharged liquor containing little or substantially no sodium chloride, is directed to a suitable recovery means for concentration and separation of the desired product. Additional dilute aqueous liquor is charged to the catholyte compartment which together with the water which passes through the permselective diaphragm by osmosis serves as makeup for the catholyte. Gaseous products, e.g., hydrogen, formed at the cathode, are discharged from the cell through gaseous outlet, 9.

By positioning the pretreated cation-active permselective membrane tautly in place the membrane remains fixed thereon and does not develop sags or blisters during operation of the cell. Thereby, the difficulties of erratic voltages occasioned by the accumulation of gas between the anode and sags or blisters in the membrane are avoided and more consistent voltages can be obtained.

Figure 2:
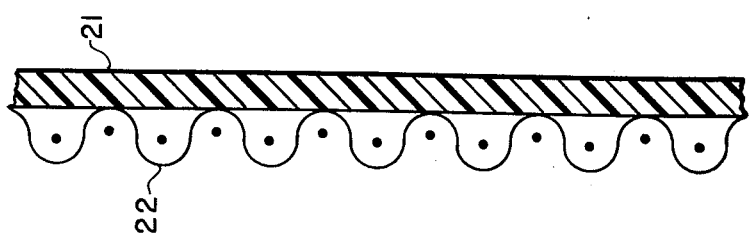
FIG. 2 is a partial sectional view of a foraminous screen anode having emplaced on one surface thereof a pretreated, taut cation-active permselective membrane.

As indicated above the anode member is a porous anode, preferably a mesh or screen anode. Such a porous anode is required to provide a path for the passage of ions, e.g., sodium ions through the cationactive permselective membrane from the anolyte compartment into the catholyte compartment. A schematic view of a preferred screen anode having the pretreated membrane tautly affixed thereto is shown in FIG. 2. As illustrated in this schematic view of a portion of the anode, which is a partial sectional view, the anode member, 22, is a foraminous mesh screen having emplaced therein, a membranous barrier member, 21. The pretreated, taut membrane may be adhesively fixed in place on the foraminous mesh screen surface or may be maintained in place by means of clamps, bars and the like (not shown). The taut membrane is securely maintained in place on the surface of the foraminous screen so as to prevent the formation of sags or blisters in the diaphragm. By this arrangement, evolution of gas occurs on the back side of the porous anode and such gas is readily discharged from the anode and thence from the cell.

Figure 3:
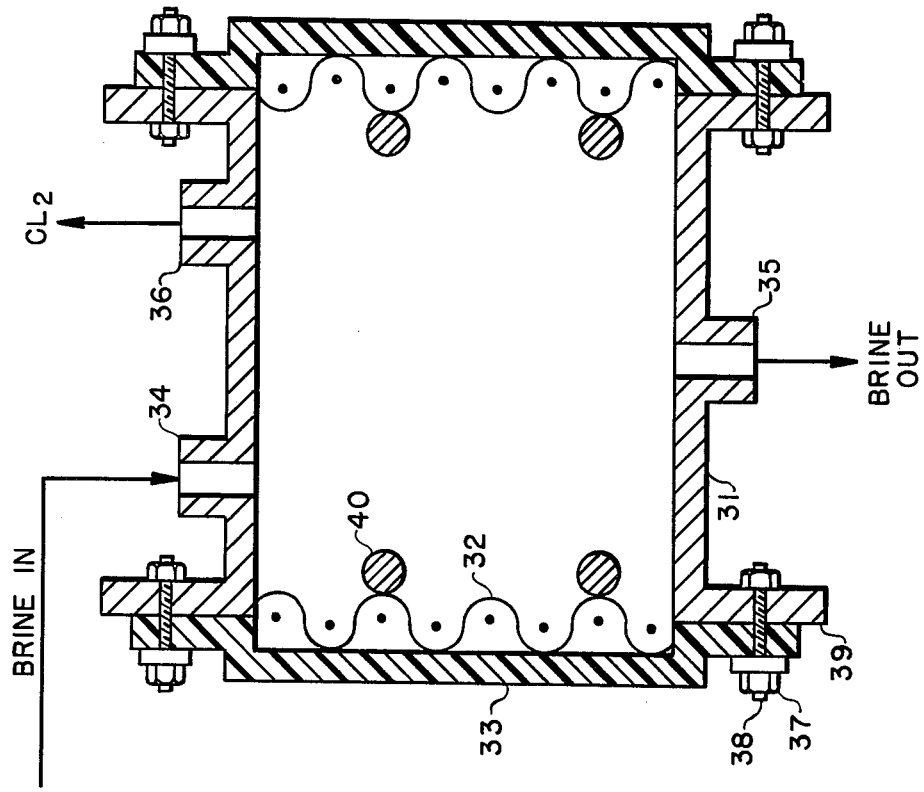
FIG. 3 is a partial sectional view of a double porous anode having a pretreated, taut membrane member securely affixed to the front face of each of the porous anodes.

Another anode design incorporating the present invention is illustrated in FIG. 3 which is a partial sectional view of a double porous anode having a pretreated, taut membrane fixedly secured over the front face of each of the foraminous screen anodes. This anode arrangement is suitable for use in the so-called "filter-press" type of electrolysis cell. As shown in this figure, a frame member 31, is provided with a brine outlet, 35, a brine inlet, 34, and a gas outlet, 36. The frame serves as a support member for two foraminous screen anodes, 32, on the front surface of which is placed a pretreated, taut cation-active permselective membrane, 33. The pretreated, taut membrane is held in place over the surface of the porous anode by a nut and bolt arrangement, 37, 38, placed at the outer periphery of the membrane and extends through the flange member, 39, of frame, 31. Current is supplied to the porous anode members, 32, by means of risers, solid bars of conductive metal, 40. By this arrangement, brine admitted to the cell is decomposed on the back face of the anode and the liberated chlorine gas travels unimpeded to the gas outlet. Sodium ions travel through the porous anode and migrate through the cation-active membrane into the cathode compartment. Substantially no sodium chloride passes through the impervious barrier into the cathode compartment.

As shown in the drawing the covered surface of the porous anode is offset from the flange member of the frame. Such an arrangement is to be preferred, since the membrane is passing over the shoulder formed by the offset portion of the anode to the flange is maintained stretched and thus is more rigidly held in place on the surface of the anode. As will be obvious, the anode face may be in a flush arrangement with the flange member, also. In this alternate arrangement, the membrane is held firmly in place on the surface of the anode by the bolting or clamping means, alone.

Figure 4:
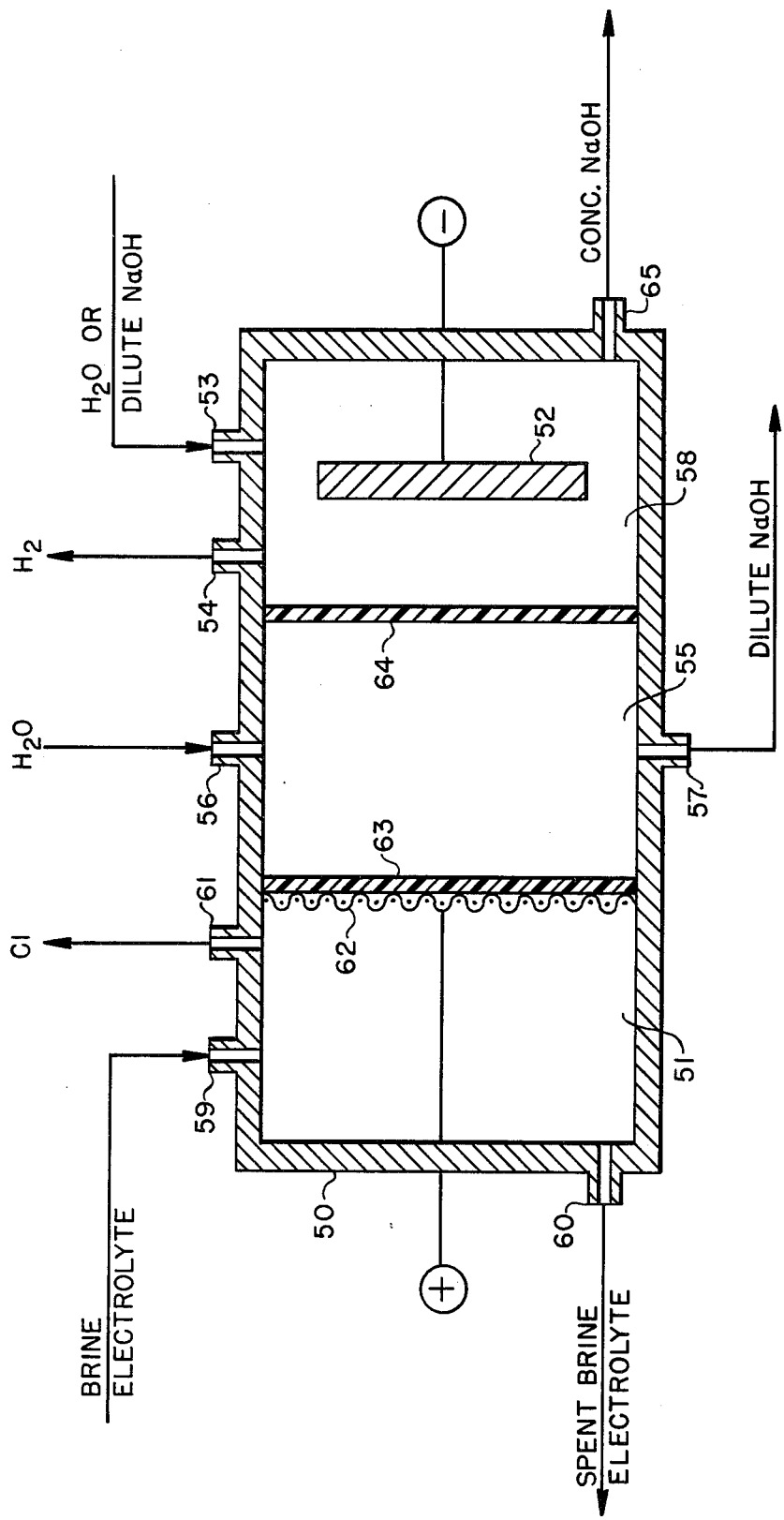
FIG. 4 is a sectional view of a multicompartment cell, comprising a single buffer compartment incorporating the present invention.

The porous anode having a pretreated, taut cation-active permselective membrane held firmly in place on one surface thereof may be used not only in a two compartment electrolytic cell as described above but also in electrolytic cells containing three or more compartments. In such cells, which are suitable also for the electrolytic decomposition of hydrohalic acid solution e.g., hydrochloric acid solution, alkali metal halide brines and the like, there is provided a cell body having an anode compartment containing a porous anode, a cathode compartment containing a cathode, and at least one buffer compartment between said anode and cathode compartments, said compartments being separated from each other by a barrier comprising a pretreated, taut cation-active permselective membrane which is impervious to fluids and gases. Such a multicompartment cell is shown in FIG. 4, which is a schematic representation of a three compartment cell incorporating the present invention. In this representation, the cell housing or body, 50, is formed into an anode compartment, 51, a cathode compartment, 58, and a buffer compartment, 55 which separates the anode and cathode compartments. A porous anode, 62, shown herein as a foraminous screen or mesh anode, and a cathode, 52, are disposed within the anode and cathode compartments respectively. Forming the buffer compartment, 55, and separating it from the anode compartment, 51, and the cathode compartment, 58, are barriers or membranes. The membrane, 63, separating the buffer compartment from the anode compartment is fixedly positioned on the inside face of the anode, 62, while the membrane, 64, separating the buffer compartment from the cathode compartment is positioned apart from the cathode, 52, in the usual manner. Both membranes, 63 and 64, are formed of cation-active permselective fluorocarbon material treated in accord with the present invention.

The anode compartment, 51, is provided with an inlet, 59, through which the electrolyte, such as an alkali metal chloride brine solution is introduced. An outlet, 60, is also provided in the anode compartment through which the depleted electrolyte is removed from the anode compartment. Additionally, the anode compartment is provided with a gas outlet, 61, through which the gaseous decomposition products of the electrolysis, such as chlorine, which are formed substantially entirely on the back face of the anode, are discharged from the anode compartment. Although the brine inlet and chlorine outlet are shown as being located in the upper portion of the anode compartment with the brine outlet in the lower portion, other arrangements of these appurtenances may be utilized if desired.

The buffer compartment, 55, is provided with an inlet, 56, and an outlet, 57. When the electrolytic cell is used for the electrolysis of sodium chloride to produce chlorine and caustic soda, water may be introduced through inlet, 56, as a feed to the buffer compartment and dilute aqueous caustic soda may be withdrawn through outlet, 57.

The cathode compartment, 58, is provided with a liquid inlet, 53, a liquid outlet, 65, through which, respectively, in the electrolysis of a sodium chloride brine, water or dilute aqueous caustic soda are introduced and concentrated aqueous caustic soda, of high purity, is recovered as a product of the electrolysis. The cathode compartment is provided, also with an outlet, 54, for the gaseous by-product, i.e., hydrogen. As in the instance of the anode compartment, the positioning of the inlets and outlets of the buffer and cathode compartments can be varied from that shown in FIG. 4.

Further, the electrolysis cell shown in FIG. 4 contains a single buffer compartment. Other cells containing more than one buffer compartment between the anode and cathode compartments can be provided by insertion of one or more additional barrier or membrane members in the space provided between the said anode compartments, as will be obvious to those skilled in this art.

Figure 5:
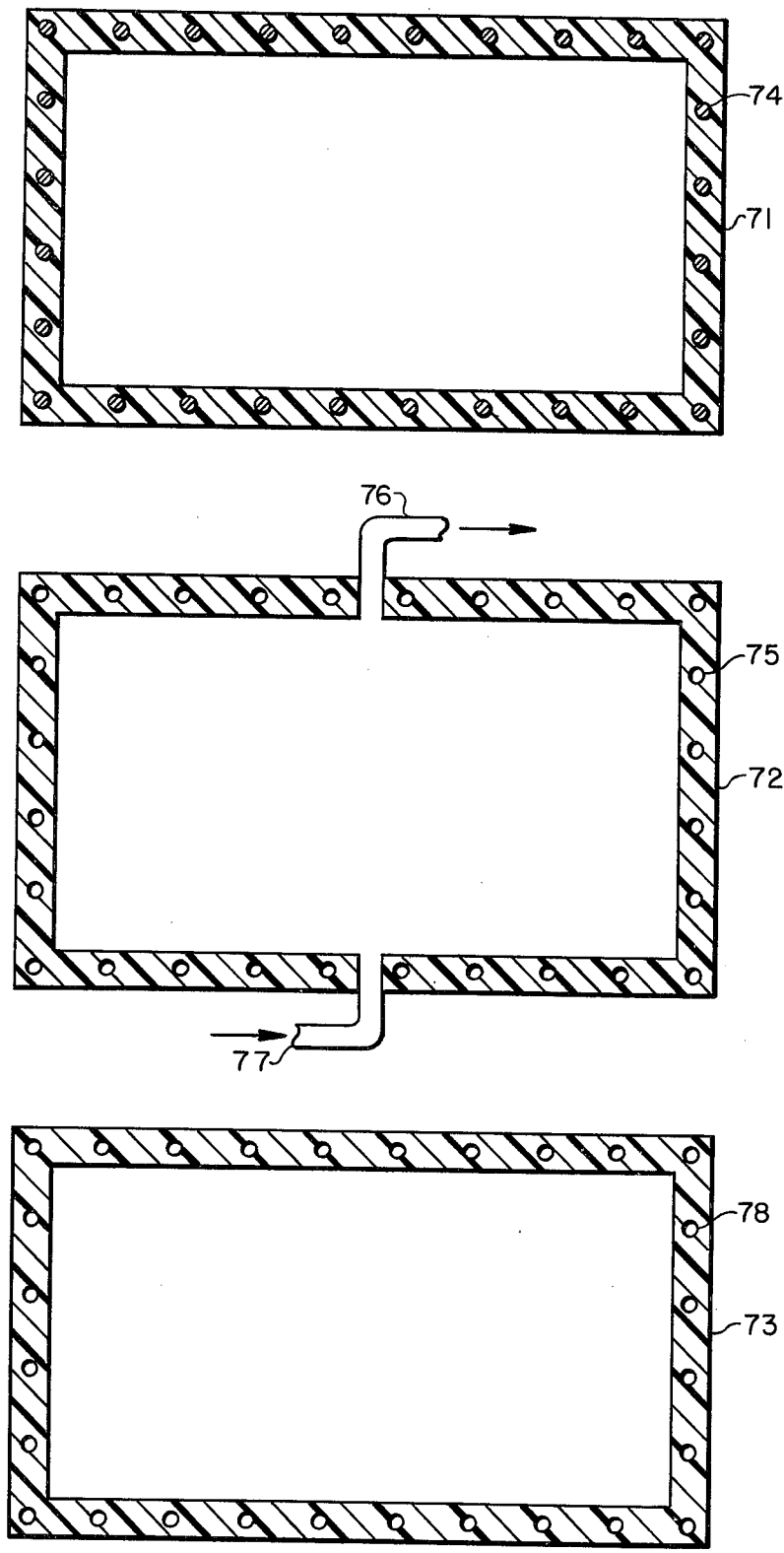
FIG. 5 is a schematic view of the three frames making up a buffer section in accordance with a preferred modification of the present invention.

An alternate preferred method and apparatus as used in forming the buffer section of a three compartment electrolysis cell will be described with reference to FIG. 5 of the attached drawings which show schematic views of three frames making up a buffer section, the first frame, 71, having pegs, 74, along the sides of said frame, a second frame, 72, having holes along the sides of said frame through which the pegs, 74, of said first frame, 71, fit, said second frame, 72, containing a liquid outlet, 76, and a liquid inlet, 77, a third frame, 73, having holes, 78, along the sides thereof adapted to receive the pegs, 74, of said first frame. Two membranes sized to fit over said second section, are immersed in boiling water until the membranes have become hydrolyzed and soft and pliable. Thereafter the softened membranes are placed on a stretching frame, stretched diagonally and clamped at the corners of the said frame. The membrane slack is pulled over the side edges of the frame and clamped at the sides. The corner clamps are removed, leaving the side clamps, and the stretched taut membrane after being permitted to dry is positioned on one side of the above described second frame, 72, on which a layer of adhesive has been applied. The procedure is repeated with the second softened membrane and it is positioned on the opposite face of said second frame, 72. Thereafter the membrane sandwich is clamped on the second frame, 72, and the adhesive is permitted to set or "dry". Then, after clamps and stretching frames are removed, leaving the pretreated, taut membrane securely attached to the faces of the said second frame, 72. Holes are punched in the membranes corresponding to the holes, 75, in the second frame, 72. The buffer section assembly is completed by placing the first frame, 71, on one side of the second frame, 72, with the pegs, 74, fitting through the holes, 75, of the second frame, and the third frame, 73, on the opposite side of the second frame, 72, with the holes, 78, meshing with the pegs, 74, extending through said second frame, 72.

Figure 6:
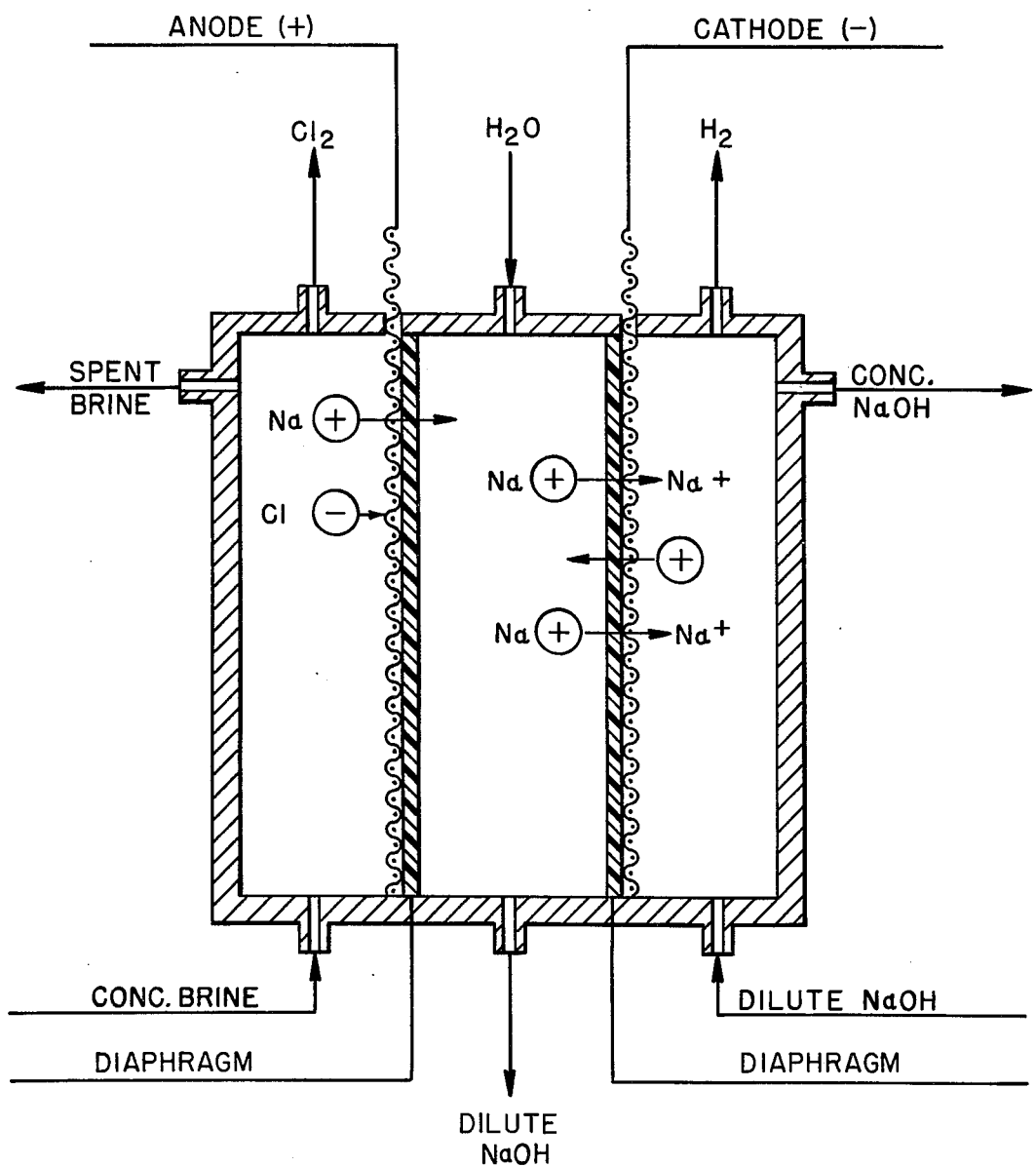
FIG. 6 is a sectional view of a three compartment electrolysis cell incorporating a preferred modification of the present invention.

There is thus formed a buffer compartment through which a dilute buffer solution may be circulated, which compartment is separated from the anode compartment by a pretreated, taut cation-active permselective barrier, and from the cathode compartment by a pretreated, taut second cation-active permselective barrier as is shown in FIG. 6. When a suitable voltage is impressed between the anode and cathode of this three compartment cell the current is carried substantially entirely by the flow of ions from the anode compartment through the first cation-active permselective barrier into and through the buffer compartment, through the second cation-active permselective barrier into the cathode compartment. Leakage of the anolyte and anodic products into the cathode compartment is substantially prevented, as is the back migration of catholyte and cathodic products by the cation-active permselective barriers and the buffer compartment.

The present invention has the desirable advantage over the prior methods of inserting barriers in electrolytic cells, in that by this procedure the half cell voltages in the anode and cathode sections of the cells do not increase substantially over those expected in such cells during normal operation. The membranes remain fixed in place and do not form the folds and/or creases which often occurred in prior membranes.

Thus the new procedure and apparatus results in the more efficient utilization of electric power in the production of highly pure, i.e. essentially salt free caustic soda and hydrogen free chlorine, operation of the cell at low cell voltage and high current efficiency.

The membrane material used in this invention consists essentially of at least one cation-active permselective material selected from the group consisting of a hydrolyzed copolymer of a perfluorinated hydrocarbon and a fluorosulfonated perfluorovinyl ether and a sulfostyrenated perfluorinated ethylene propylene polymer.

In a preferred embodiment of this invention the cation-active permselective membranes are composed essentially of co-polymers of tetrafluoroethylene and a sulfonated perfluorovinylether having the formula $$FSO_2CF_2CF_2OCF(CF_3)CF_2OCF=CF_2$$

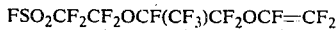

said copolymer having an equivalent weight of from about 900 to about 1600. Preferably the equivalent weight of the copolymer is in the range of from about 1100 to about 1400.

Co-polymers of the character referred to above are prepared as disclosed in U.S. Pat. No. 3,282,875, by reacting, at a temperature below about 110° C. a perfluorovinylether of the formula $$FSO_2CF_2CF_2OCF(CF_3)CF_2OCF=CF_2$$

with tetrafluoroethylene in an aqueous liquid phase, preferably at a pH of 8 or below, and in the presence of a free radical initiator such as ammonium persulfate. Subsequently this co-polymer is hydrolyzed to the free acid or salt formed by conventional means.

Thus, the presently preferred cation selective membrane material is of a hydrolyzed copolymer of a perfluorinated hydrocarbon and a fluorosulfonated perfluorovinyl ether. The perfluorinated hydrocarbon is preferably tetrafluoroethylene although other perfluorinated saturated and unsaturated hydrocarbons of from 2 to 5 carbon atoms can also be utilized, of which the monoolefinic hydrocarbons are preferred, especially those of 2 to 4 carbon atoms and most especially those of 2 to 3 carbon atoms, e.g., tetrafluoroethylene, and hexafluoropropylene. The sulfonated perfluorovinyl ether which is most useful is that of the formula $$FSO_2CF_2CF_2OCF(CF_3)CF_2OCF=CF_2$$

This material, named as perfluoro [2-(2-fluorosulfonylethoxy)-propyl] vinyl ether, may be modified to equivalent monomers, as by modifying the internal perfluorosulfonylethoxy moiety to the corresponding propoxy moiety, and by altering the propyl group to ethyl or butyl group, and by rearranging the positions of substitutes of the sulfonyl group thereon and by utilization of the perfluoro lower alkyl groups respectively.

The method of manufacture of the fluorosulfonyl copolymer is described in Example XVII of the above referred to U.S. Pat. No. 3,282,875 and an alternate method is disclosed in Canadian Pat. No. 849,670, which also discloses the use of these and analogous membranes in fuel cells, characterized therein as electrochemical cells. The disclosures of such patents are hereby incorporated herein by reference. In short, the copolymer can be made by reacting fluorosulfonated perfluorovinyl ether or the equivalent with tetrafluoroethylene or equivalent in the desired proportions in water at elevated temperatures and pressures for over an hour after which time the reaction mass is cooled. The mixture separates into a lower perfluoroether layer and an upper layer of an aqueous dispersion of the desired polymer. The molecular weight of the latter is indeterminate but the equivalent weight is from about 900 to about 1600, preferably from about 1100 to about 1400, and the percentage of the fluorosulfonated perfluorovinyl ether or corresponding compound is about 10 to 30 percent by weight, preferably about 15 to 20 percent by weight and most preferably about 17 percent by weight. The unhydrolyzed copolymer may be compression molded at high temperatures and pressures to produce sheets or membranes which may vary in thickness from about 0.002 to 0.5 mm. These then may be further treated to hydrolyze the pendant — $SO_2F$ to —$SO_3H$ groups as by boiling in water or in 10 percent aqueous sulfuric acid or by the methods of the patents previously mentioned. The presence of the —$SO_3H$ groups may be verified by titration with standard base as described in the Canadian patent previously mentioned. Additional details of various processing steps are described in Canadian Pat. No. 752,427 and U.S. Pat. No. 3,041,317, also hereby incorporated by reference.

As discussed above, because it has been found that some expansion or swelling accompanies the hydrolysis of the copolymer, it is advantageous to position the copolymer membrane into a frame or other support means to hold it in place on the surface of the electrode in the electrochemical cell. Thereafter it may be clamped or cemented in place on the electrode and will be true and taut without sags or blisters. The membrane material is preferably joined to the backing material, e.g., tetrafluoroethylene or other suitable filamentary material prior to hydrolysis when the copolymer is still thermoplastic and the film of copolymer covers each filament penetrating into the spaces or interstices of the backing material between them and even around behind them, thinning the films slightly in the process where it covers the filaments.

The cation-active permselective membrane material described above is far superior when assembled in the electrochemical cell as described herein to previously suggested materials. The new material is more stable at elevated temperatures, e.g. above 75° C. It lasts for much longer periods in the medium of the electrolyte and does not become brittle when exposed to chlorine at high cell temperatures. Moreover when assembled on the face of the electrode elements of the cell as described herein, the permissible gap between the electrodes can be substantially reduced and maintained constant resulting in increased power efficiency. Considering the savings in time, maintenance, and fabrication costs, these membranes are more economical. The voltage drop through the membranes is acceptable, does not vary due to the formation of bubbles or sags and does not become inordinately high as it does with many other membrane materials, when the caustic concentration in the cathode compartment increases to above about 200g/l. The selectivity of the membrane and its compatability with the electrolyte does not decrease as the hydroxyl concentration of the catholyte liquor increases, as has been noted with other membrane materials, nor does the caustic efficiency of the electrolysis diminish as significantly as it does with other membranes as the electrolysis proceeds. Thus these improvements in the present membranes and the manner of emplacement thereof in the cell make it more practicable whereas previously disclosed ion-exchange membrane materials have not attained commercial acceptance. While the more preferred copolymers are those having equivalent weights of from about 900 to about 1600, with about 1100 to about 1400 being especially preferred, some useful resinous membranes of this same genre have equivalent weights within the range of about 500 to 4000. The intermediate equivalent weight copolymers are preferred because they are of satisfactory strength, stability, permselectivity, enable better selective ion exchange to take place and are of lower internal resistance, all of which are important in the electrochemical art.

Improved versions of the above-described copolymers may be made by chemical treatment of the surfaces thereof, as by treatments to modify the —SO$_3$H groups thereon. For example, the sulfonic acid groups may be altered or replaced in whole or in part with other moieties. Such changes may be made in the copolymer manufacturing process or after production of the membrane. When effected as a subsequent treatment of the membrane, the depth of the treatment will usually be from 0.001 to 0.01 mm. Caustic efficiencies of the improved processes using such modified versions of the present improved membranes can increase about 3 to about 20% or more, usually about 5 to 15%.

Exemplary of such treatments is that described in French Pat. No. 2,152,194 of Mar. 26, 1973 in which one side of the fluorocarbon membrane is treated with ammonia to convert the pendant sulfonyl groups to sulfonamide groups.

In addition to the copolymers discussed above, including modifications thereof, it has been found that another membrane material is also superior to prior art film for applications in electrochemical cells. Although it appears that tetrafluoroethylene polymers which are sequentially styrenated and sulfonated are not useful for making satisfactory cation-active permselective membranes acceptable for use in electrochemical processes, it has been found that perfluorinated ethylene propylene polymer which has been styrenated and sulfonated does make a useful cation-active permselective membrane material. Whereas useful lives of as much as three years or more (that of the preferred copolymer material) may not be obtained with this alternate material, it is surprisingly resistant to hardening under normal use conditions.

To manufacture the sulfostyrenated perfluorinated ethylene propylene polymers, a commercially available perfluoroethylene propylene polymer is styrenated and then the styrenated product is sulfonated. A solution of styrene in methylene chloride, benzene, or analogous solvent at a suitable concentration in the range of about 10 to about 20 percent by weight is prepared and a sheet of the polymer having a thickness of about 0.02 to 0.5 mm, preferably 0.05 to 0.15 mm, is immersed in the solution. After removal, the sheet is subjected to a radiation treatment, using a cobalt 60 radiation source. The rate of application may be in the range of about 8000 rads/hr. and a total radiation application should be about 0.9 megerads. After rinsing the irradiated sheet with water, the phenyl nuclei of the styrene portion of the polymer are monosulfonated, preferably in the para position, by treatment with chlorosulfonic acid, fuming sulfuric acid (oleum) or sulfur trioxide. Preferably chlorosulfonic acid in chloroform is used and the sulfonation may be completed in about ½ hour at ambient temperature.

Examples of such useful membranes made by the above described process are products of RAI Research Corporation, Hauppauge, N.Y., and are identified as 18ST12S and 16ST13S, the former being 18% styrenated and having about ⅔ of the phenyl nuclei monosulfonated and the latter being 16% styrenated and having 13/16 of the phenyl nuclei monosulfonated. To obtain 18% styrenation, a solution of 17½% styrene in methylene chloride is utilized and to obtain a 16% styrenation, a 16% styrene solution in methylene chloride is employed.

The products resulting from this process compare favorably with the preferred copolymers previously described giving voltage drops of about 0.2 volt each in a typical electrochemical cell at a current density of 2 amperes/sq. in about the same as is obtained with the preferred copolymer.

The membranes useful in the practice of the present invention can be advantageously prepared and utilized in the form of a thin film, either as such or deposited on a inert support such as a cloth woven of Teflon ® or glass fibers. The thickness of such supported membranes can be varied over a considerable range, for example, from about 5 to about 15 mils in thickness.

The membrane can be fabricated in any desired shape. As generally prepared the preferred co-polymer membrane material is obtained in the form of the sulfonyl fluoride. In this non-acid form the polymer is somewhat soft and pliable and can be seam- or but-welded forming welds which are as strong as the membrane material itself. It is preferred that the polymeric material be shaped and formed in this non-acid state. Following shaping and forming into the desired membrane configuration, the material is conditioned for use as a barrier by hydrolyzing the sulfonyl fluoride groups to free acid or sodium sulfonate groups by boiling in water or aqueous caustic soda solution. On boiling in water the conditioned membrane undergoes swelling, about 28 percent, which is isotropic, about 9 percent in each direction, and the material becomes soft and pliable.

It has been found that the water absorption increases on long term boiling and over a period of 100 days an absorption about 33% by weight of water is taken up by the membrane. However, a hydrolyzed, taut membrane suited to use in the present invention may be obtained by the utilization of shorter periods of time, usually in the range of 1 to 4 hours wherein 30 to 31% by weight of water is absorbed by the membrane material and in this time range the membrane material becomes soft and pliable suited to stretching.

The electrodes for the present electrolytic cell may be formed of any electrically conductive material which will resist the corrosive attack of the various cell reactants and products with which they may come in contact, such as alkali metal hydroxides, hydrochloric acid, and clorine. Typically, the cathodes may be constructed of graphite, iron, steel, or the like, with steel being generally preferred. Similarly, the anodes may be formed of graphite or may be metallic anodes. Typically, the porous metallic anodes may be formed of a so-called "valve" metal, such as titanium, tantalum or niobium as well as alloys of these in which the valve metal constitutes at least about 90% of the alloy. The surface of the valve metal may be made active by means of a coating comprising one or more noble metals, noble metal oxides, or mixtures of such oxides, either alone or with oxides of other metals. The noble metals which may be used include ruthenium, rhodium, palladium, irridium, and platinum. Particularly preferred metal anodes are those formed of titanium and having a mixed titanium oxide and ruthenium oxide coating on the surface, as is described in U.S. Pat. No. 3,632,498. Additionally, the valve metal substrate may be clad on a more electrically conductive metal core, such as aluminum, steel, copper, or the like.

The cell body or container is formed into at least one set or unit of compartments made up of an anode compartment, containing the anode, a cathode compartment, containing the cathode, and may contain one or more buffer compartments between the anode and cathode compartments. Typically, the electrolytic cell may contain a plurality of these sets, e.g., 20 to 30 or more, depending upon the size of the cell.

The following example will illustrate the present invention. Parts and percentages are by weight and temperatures are given in degrees centigrade, unless otherwise specified.

EXAMPLE I

A section of teflon fabric reinforced membrane of the hydrolyzed copolymer of perfluorinated hydrocarbon and a fluorosulfonated perfluorovinyl ether type was soaked in boiling water by immersion for 2 hours. The hot, hydrolyzed membrane was found to be soft and pliable. The membrane was then stretched on a wooden frame. Stretching was accomplished by initially stretching the membrane diagonally and securing the ends of the membrane to the frame at the corners with clamps and subsequently stretching the sides and securing the sides of the membrane to the sides of the frame with clamps. The corner clamps were then removed and the stretched, taut membrane was left to dry. A ½ inch wide strip of Devcon 2 Ton Epoxy resin cement was spread around the inside of an anode flange. The wooden frame with the pretreated, taut membrane was then positioned on the cemented surface of the anode so that the membrane is in contact with the cement and the wooden frame clamped to the anode frame. After two hours at room temperatures the clamps and wooden frame were removed. The result is a pretreated, taut membrane positioned on an anode member. The excess membrane material around the edges of the anode member are trimmed and the anode member and membrane were ready for use in an electrolytic cell.

EXAMPLE II

A conventional two compartment cell was utilized in this example. In this cell, the anode compartment containing a ruthenium oxide coated titanium clad steel mesh anode was fed with an acidified concentrated brine solution which was circulated continuously during the electrolysis. The cathode compartment was filled initially with dilute aqueous caustic soda which during the electrolysis was fed continuously to the cathode compartment as make up. The anode and cathode compartments were separated by a membrane composed of a hydrolyzed copolymer of perfluoroethylene and a sulfonated perfluorovinyl ether supported on a teflon cloth as described hereinabove. The membrane was pretreated and stretched as described in Example 1. The membrane was about 7 mils in thickness, and was tautly positioned on the front face of the anode.

The cell was operated over a period of 30 hours by applying a decomposition voltage at 2 amperes per square inch of anode surface. During this run a constant voltage of 3.88 was observed. The other operating conditions during this run were:

Caustic concentration: 155 gpl
Catholyte temperature: 90° to 94°
Anolyte temperature: 88° to 91°
Anolyte salt concentration: 292 to 309 gpl
Anolyte pH: 3.8 to 4.6

The caustic soda liquor produced in the cathode compartment contained less than 1.0 percent sodium chloride. The chlorine evolved from the anode compartment was free from hydrogen, and the hydrogen evolved from the cathode compartment was free from chlorine.

We claim:

1. An electrolytic cell which comprises a cell body having an anode compartment containing a porous anode, and a cathode compartment containing a cathode, said compartments being separated from each other by a barrier which is substantially impervious to gases and fluids selected from a sulfonated perfluorovinyl ether and a sulfostyrenated perfluorinated ethylene propylene polymer, said barrier being pretreated by boiling in water for at least one hour, tautly stretched, dried at ambient temperatures and cemented across the front face of the said porous anode.

2. The electrolytic cell as claimed in claim 1 wherein the barrier is a hydrolyzed copolymer of tetrafluoroethylene and a sulfonated perfluorovinyl ether having the formula:

$$FSO_2CF_2CF_2OCF(CF_3)CF_2OCF=CF_2$$

which copolymer has an equivalent weight of from about 900 to 1600.

3. The electrolytic cell as claimed in claim 2 wherein the copolymer has an equivalent weight of from about 1100 to about 1400 and contains from about 10 to 30% of the ether compound.

4. The electrolytic cell as claimed in claim 3 wherein the anode is a metallic anode.

5. The electrolytic cell as claimed in claim 3 wherein the cell is formed with at least one buffer compartment between the anode compartment and the cathode compartment.

6. The electrolytic cell as claimed in claim 1 wherein the barrier is a sulfostyrenated perfluorinated ethylene propylene polymer.

7. The electrolytic cell as claimed in claim 6 wherein the copolymer is styrenated to from about 16 to 18 percent by weight and from about ⅜ to 13/16 of the phenol groups are monosulfonated.

8. The electrolytic cell as claimed in claim 7 wherein the anode is a metallic anode.

9. The electrolytic cell as claimed in claim 6 wherein the cell is formed with at least one buffer compartment between the anode compartment and the cathode compartment.

10. The electrolytic cell as claimed in claim 1 wherein the anode is a metallic anode.

11. The electrolytic cell as claimed in claim 10 wherein the cell is formed with at least one buffer compartment between the anode compartment and the cathode compartment.

12. The electrolytic cell as claimed in claim 1 wherein the cell is formed with at least one buffer compartment between the anode compartment and the cathode compartment.

13. The electrolytic cell as claimed in claim 1 wherein said porous anode is formed of a valve metal the surface of which has been made active by means of a coating comprising a noble, metal, noble metal oxide or a mixture thereof.

14. The electrolytic cell as claimed in claim 13 wherein said valve metal is titanium and said coating comprises ruthenium oxide.

15. The electrolytic cell as claimed in claim 1 wherein the porous anode is mounted on a frame, the front face of said anode being offset from said frame and projecting toward the cathode.

16. In an apparatus for the electrolytic decomposition of ionizable inorganic compounds comprising a housing, an anode compartment, and a cathode compartment, said anode compartment being separated from said cathode compartment by at least one cation-active permselective barrier, said anode compartment containing a means for introducing liquid solutions and a means for removing liquid solutions, said cathode compartment containing means for introducing liquid solutions and for removing liquid solutions, an anode and a cathode, and means for impressing an electric current across said anode and said cathode, the improvement which comprises pretreating the permselective barrier by boiling in water for at least one hour and tautly stretching, drying at ambient temperature, and cementing the barrier across the surface of said anode.

17. A method for mounting barriers consisting essentially of membranes prepared from co-polymers of tetrafluoroethyl and sulfonated perfluorovinylether of the formula $$FSO_2CF_2CF_2OCF(CF_3)CF_2OCF=CF_2$$

in electrolysis cells, which comprises immersing said membranes in a hot aqueous media for at least 1 hour until said membranes are soft and pliable;
stretching said softened membrane on a frame;
drying said stretched membrane on said frame at ambient temperatures;
securing the dried membrane to an anode, cathode or buffer section of an electrolysis cell, and thereafter;
removing said frame from the membrane.

18. A barrier section for use in electrolytic cells comprising
(1) A barrier support
(2) a porous anode mounted on said barrier support, and
(3) at least one permselective membrane consisting essentially of a hydrolyzed copolymer of tetrafluoroethylene and a sulfonated perfluorovinylether of the formula $$FSO_2CF_2CF_2OCF(CF_3)CF_2OCF=CF_2$$

said membrane having been immersed in boiling aqueous media for at least 1 hour, stretched, dried in the stretched condition at ambient temperature and then securely affixed while taut to said barrier support, said membrane covering one face of said porous anode.

19. A barrier section as described in claim 18 wherein said porous anode is positioned on said support with the front face of said anode offset from the frame of said support, said front face being covered by said membrane.

* * * * *